US009694769B2

United States Patent
Namuduri et al.

(10) Patent No.: US 9,694,769 B2
(45) Date of Patent: Jul. 4, 2017

(54) SMART POWER DISTRIBUTION UNIT

(71) Applicant: GM GLOBAL TECHNOLOGY OPERATIONS LLC, Detroit, MI (US)

(72) Inventors: Chandra S. Namuduri, Troy, MI (US); Shawn L. Boozer, Clarkston, MI (US); Kenneth J. Shoemaker, Highland, MI (US); Michael G. Reynolds, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 601 days.

(21) Appl. No.: 14/245,774

(22) Filed: Apr. 4, 2014

(65) Prior Publication Data

US 2014/0375118 A1 Dec. 25, 2014

Related U.S. Application Data

(60) Provisional application No. 61/838,026, filed on Jun. 21, 2013.

(51) Int. Cl.
*B60R 16/033* (2006.01)

(52) U.S. Cl.
CPC ........ *B60R 16/033* (2013.01); *Y10T 29/49117* (2015.01)

(58) Field of Classification Search
CPC .................................................. B60R 16/033
USPC ........................................................ 307/9.1
See application file for complete search history.

(56) References Cited

U.S. PATENT DOCUMENTS

| | | | | |
|---|---|---|---|---|
| 6,313,546 B1* | 11/2001 | Nishimura | ............ | H02J 7/0054 307/125 |
| 6,606,227 B2* | 8/2003 | Rapsinski | ............. | H02H 9/042 307/10.2 |
| 2011/0140518 A1* | 6/2011 | Hattori | ................. | H02J 7/1423 307/9.1 |

OTHER PUBLICATIONS

U.S. Appl. No. 14/245,746, filed Apr. 4, 2014, Namuduri et al.

* cited by examiner

*Primary Examiner* — Joseph Chang

(57) ABSTRACT

Apparatus for voltage stabilization in a vehicle includes a battery distribution module having a load module managing electrical power to one or more auxiliary loads, a first switch coupling a starter motor and an ESD to the load module only when closed, a second switch coupling an auxiliary ESD to the load module only when closed, and a controller integrated with a PC board attached to the first and second switch devices. The controller is configured to control opening and closing of the first and second switches based on at least one of a plurality of signals received by the controller. The primary ESD is electrically coupled a primary fuse terminal of the battery distribution module which electrically couples the primary ESD to a second terminal of the first switch and the starter motor. The auxiliary ESD is electrically coupled to an auxiliary fuse terminal of the battery distribution module which electrically couples a first terminal of the second switch to the auxiliary ESD.

20 Claims, 10 Drawing Sheets ced SMART POWER DISTRIBUTION UNIT

CROSS REFERENCE TO RELATED APPLICATIONS

This application claims the benefit of U.S. Provisional Application No. 61/838,026, filed on Jun. 21, 2013, which is incorporated herein by reference.

TECHNICAL FIELD

This disclosure is related to a battery distribution unit with integrated electronics for a dual electrical energy storage system for stabilizing voltage applied to loads in a vehicle during engine cranking events.

BACKGROUND

The statements in this section merely provide background information related to the present disclosure. Accordingly, such statements are not intended to constitute an admission of prior art.

Powertrain systems of vehicles can employ engine autostopping strategies to shutdown an engine when a vehicle is stopped. For instance, when a vehicle is stopped at a traffic light and an operator of the vehicle has a brake pedal depressed, the engine can be automatically stopped and shut down (e.g., fuel cut-off event). When vehicle motion is desired, the engine can automatically start to provide motive torque to the drive wheels. One drawback of automatically stopping and starting an engine is that electrical energy required from an energy storage device to supply a starter motor for cranking the engine can temporarily result in large voltage drops at other vehicle loads to which the electrical energy storage device is also supplying energy. These voltage drops, commonly referred to as voltage sag, can result in diagnostic faults in the electrical system, controller resets and other undesirable electrical anomalies such as vehicle interior lighting flicker and accessories being interrupted.

It is known to utilize a DC-DC boost converter to boost sagging battery voltages during an engine autostart to supply stable voltage to certain critical loads. However, DC-DC boost converters require partitioning of all the electrical loads that are supported and are limited to low power loads, e.g., loads less than about 400 Watts. DC-DC converters may require packaging space inside the passenger compartment to avoid under-hood environment which makes them more expensive. Another drawback to DC-DC converters is that higher load power leads to accelerated deterioration of battery voltage during the auto start and ineffective voltage stabilization. Additionally, DC-DC boost converter use on vehicles with higher electrical loads is cost prohibitive.

It is known to utilize a pre-fuse center in a vehicle in conjunction with a battery to distribute the DC power to key electrical loads through protective fuses that prevent overheating of the cables that carry power to individual loads and other local distribution centers such as Bussed Electrical Centers (BECs) in the front and rear of the vehicle.

SUMMARY

Method for assembling a battery distribution module includes electrically coupling an external electrical bus to each of a first switch device and a second switch device. The first switch device including a second terminal electrically coupled to a primary electrical energy storage device (ESD) and a first terminal electrically coupled to one or more auxiliary loads. A second switch device including a second terminal electrically coupled to the one or more auxiliary loads and a first terminal electrically coupled to an auxiliary ESD. A printed circuit (PC) board is attached to the first and second switch devices, the PC board including an integrated controller configured to control opening and closing of the first and second switch devices. A primary fuse terminal of the external electrical bus is attached directly to the primary ESD to electrically couple the primary ESD to the source of the first switch device and a starter motor.

BRIEF DESCRIPTION OF THE DRAWINGS

One or more embodiments will now be described, by way of example, with reference to the accompanying drawings, in which:

FIG. 2 illustrates a known battery isolator circuit corresponding to an isolator and the known pre-fuse center of FIGS. 1-1 and 1-2, in accordance with the present disclosure;

FIGS. 4-1 and 4-2 illustrate exemplary battery isolator controllers utilized for voltage stabilization during engine autostart and autostop events, in accordance with the present disclosure;

FIGS. 6-1 to 6-4 illustrate assembly of the exemplary battery distribution module 110' of FIG. 4-2, in accordance with the present disclosure;

DETAILED DESCRIPTION

Figure 1:
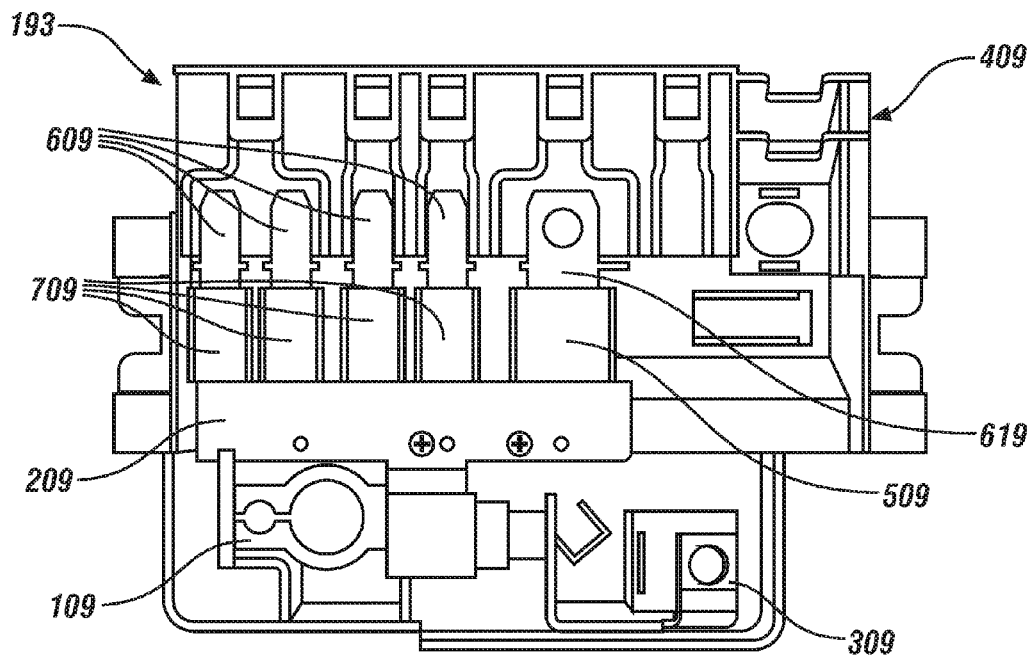
FIGS. 1-1 and 1-2 illustrate a known pre-fuse center configured to direct current from a primary energy storage device (ESD) to one or more auxiliary loads of a vehicle during an engine autostart event, in accordance with the present disclosure.
Figures 1, 2:
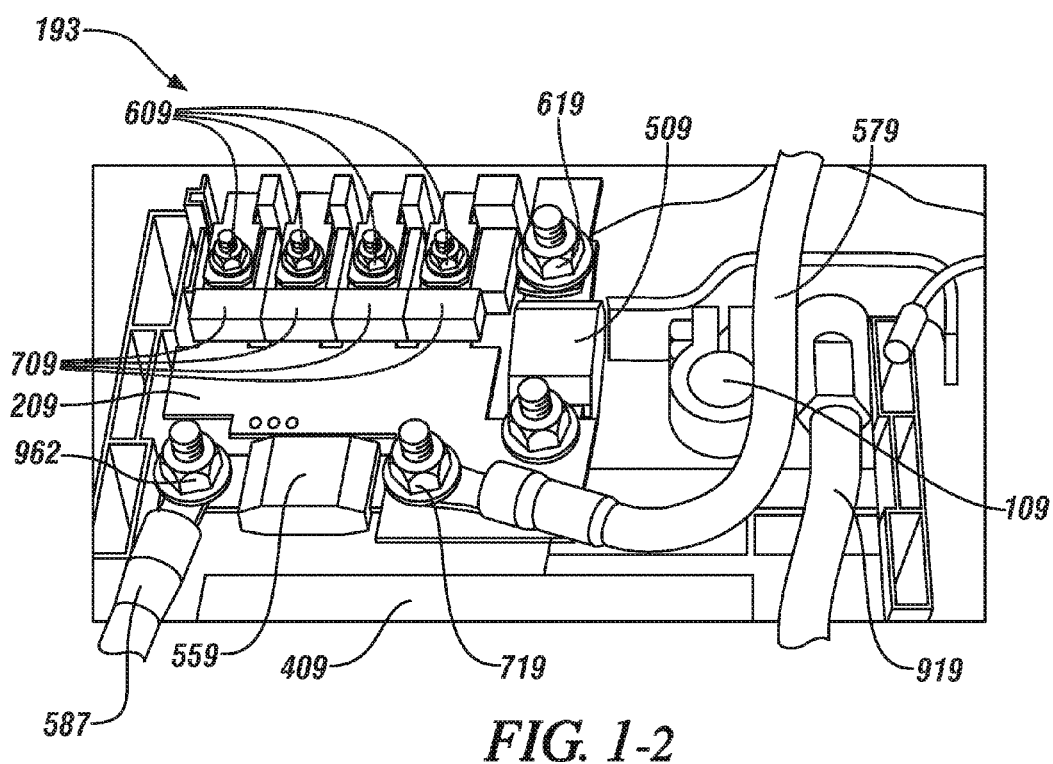
Figure 2:
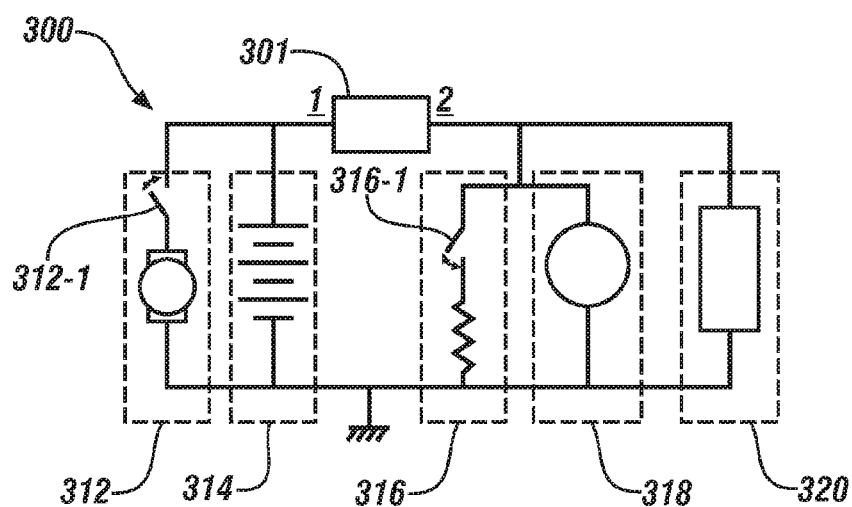

Referring now to the drawings, wherein the showings are for the purpose of illustrating certain exemplary embodiments only and not for the purpose of limiting the same, FIGS. 1-1 and 1-2 schematically illustrate a known pre-fuse center 193 configured to direct DC voltage from a primary energy storage device (ESD) to one or more auxiliary loads of a vehicle during an engine autostart event, in accordance with the present disclosure. Referring to FIG. 1-1 the exemplary packaging of the pre-fuse center 193 includes a molded plastic case 409 configured to receive a plurality of auxiliary load connection points 609 and respective fuses 709, a power bus bar 209, a primary ESD positive terminal connection point 109, a generator and a bussed electrical center (BEC) module terminal connection point 619 and a corresponding fuse 509, and an un-fused primary ESD terminal 309.

Referring to FIG. 1-2, the packaged pre-fuse center 193 includes the plurality of auxiliary load connection points 609 and respective fuses 709, the power bus bar 209, and the generator and the BEC module terminal connection point 619 and the corresponding fuse 509. In one embodiment, the fuse 509 can be a high current fuse and the fuses 709 can be low current fuses. The pre-fuse center 193 further includes an auxiliary ESD positive terminal connection point 719 connected to an auxiliary ESD positive terminal via wire 579, the primary ESD positive terminal connection point 109 connected to a first terminal of an isolator and the positive terminal of the primary ESD via wire 919, and a terminal connection point 962 connecting a high current fuse 559 of the pre-fuse center 193 to a second terminal of the isolator via wire 587. Specifically, wire 587 connects the plurality of auxiliary loads via connection points 609 to the second terminal of the isolator, enabling the primary ESD to power the plurality of loads when the isolator is operative in the closed state.

The pre-fuse center 193 is packaged within the vehicle at a location external to the primary ESD. Thus, the pre-fuse center 193 is not integrated with the primary ESD. For instance, the pre-fuse center 193 can be located within the passenger compartment of the vehicle underneath passenger seats. The pre-fuse center 193 is not integrated with the isolator and associated control electronics. Costs associated with wiring and packaging restraints are increased when utilizing the known pre-fuse center 193. As will become apparent with reference to FIG. 2, the isolator (e.g., 301 in FIG. 2), that may include a switch or diode, connects the primary ESD to the plurality of auxiliary loads when operative in a closed state and disconnects the primary ESD from the plurality of auxiliary loads when operative in an open state.

FIG. 2 illustrates a known battery isolator circuit 300 corresponding to the isolator and the pre-fuse center 193 of FIGS. 1-1 and 1-2, in accordance with the present disclosure. The circuit 300 includes the isolator 301 (also referred to as an isolator switch 301), an electrical bus including a starter motor 312, the primary ESD 314, auxiliary loads 316, the generator 318, and the auxiliary ESD 320. In the illustrated embodiment, the primary ESD 314 can be referred to as a cranking battery and the auxiliary ESD 320 can be referred to as a secondary ESD. The first terminal "1" of the isolator 301 is connected to the starter motor 312 and the positive terminal of the primary ESD 314. The second terminal "2" of the isolator 301 is connected to the auxiliary loads 316 and the positive terminal of the auxiliary ESD 320. The auxiliary ESD 320 is always connected to the auxiliary loads 316. The auxiliary loads 16 can include one or more loads of the vehicle such as, but not limited to, an air conditioning compressor, vehicle interior lighting, power seat operation, and an entertainment system. Each auxiliary load 16 requiring power, may include a respective switch 316-1 so that power to the one or more auxiliary loads can be provided from the primary ESD 314 based on whether the isolator switch 301 is operative in the closed state. During autostart events, switch 301 is allowed to open when the voltage of the primary ESD 314 falls below that of the positive terminal of the auxiliary loads 316 (e.g., Load+ terminal) by a predetermined magnitude of voltage (e.g., 0.1V) due to high current drawn by the starter motor 312. The auxiliary ESD 320 may maintain the load voltage at a level higher than that of the primary ESD 314 during the autostart event depending on its state of charge and the load current level. Once the engine is started, the starter motor 312 is disconnected from the primary ESD 314, and the voltage of the primary ESD 314 returns substantially near its pre-autostart level, wherein the isolator switch 301 is allowed to close and the generator 318 can recharge both the primary ESD 314 and the auxiliary ESD 320. During an engine autostop event, the primary ESD 314 is discharged to support the auxiliary loads 316 and the state of charge of the auxiliary ESD 20 fluctuates along with that of the primary ESD 314, resulting in a diminished service life of the auxiliary ESD 320. The starter motor 312 may include a respective switch 312-1 so that power can be provided to the starter motor 312 from the primary ESD 314 for cranking the engine during an engine start event, e.g., an autostart event.

Figure 3:
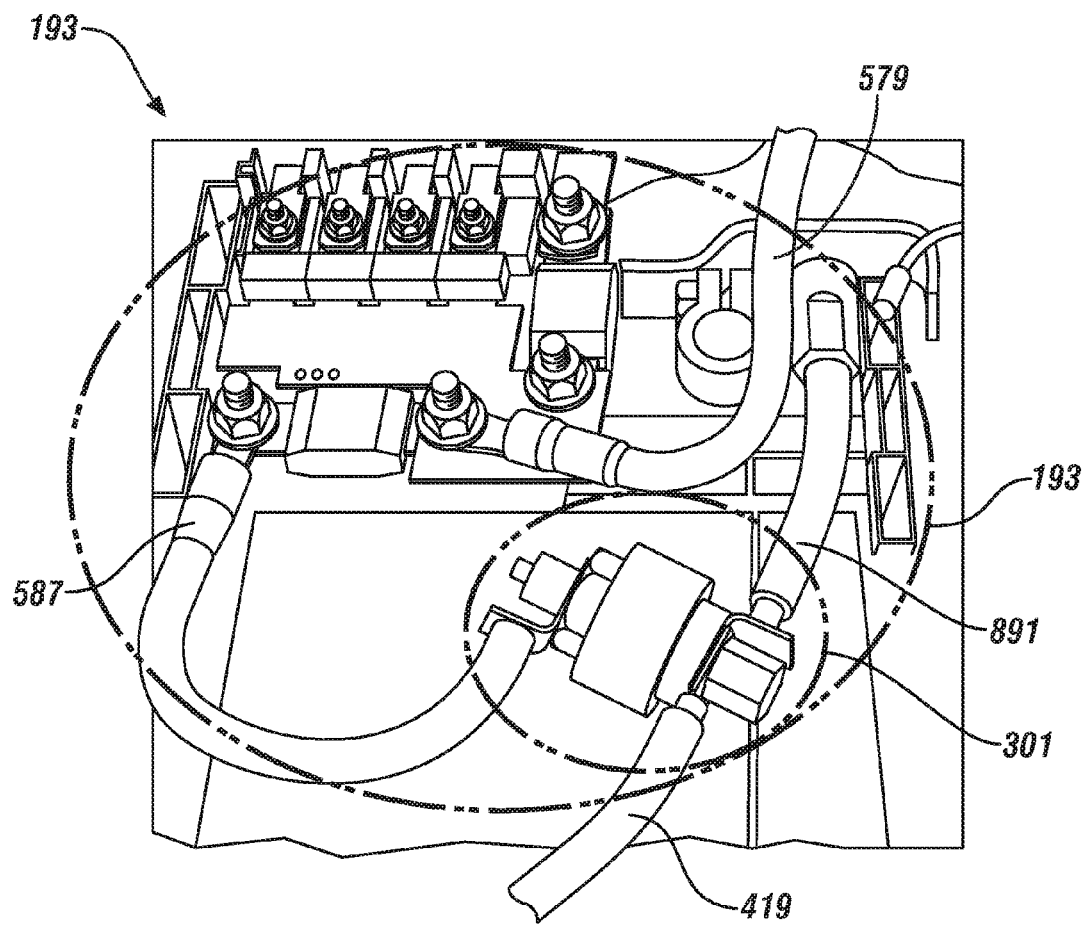
FIG. 3 illustrates an exemplary view of a portion of an engine compartment utilizing the known pre-fuse center of FIGS. 1-1 and 1-2 with reference to the battery isolator circuit of FIG. 2, in accordance with the present disclosure.

FIG. 3 illustrates an exemplary view of a portion 361 of an engine compartment utilizing the known the pre-fuse center 193 of FIGS. 1-1 and 1-2 with reference to the battery isolator circuit 301 of FIG. 2, in accordance with the present disclosure. Within the portion 361 of the engine compartment, a starter motor wire 419 connects the starter motor to the first terminal of the isolator 301. As aforementioned, the first terminal of the isolator 301 is also connected to the positive terminal of the primary ESD 314 via wire 891. The portion 361 of the engine compartment further includes wire 587 connecting the second terminal of the isolator 301 and the auxiliary loads. In addition to the pre-fuse center 193 being external to the primary ESD 314, the isolator 301 is additionally external to each of the pre-fuse center 193 and the primary ESD 320. As used herein, the term "external to the primary ESD" refers to the pre-fuse center not being directly attached to the primary ESD 314 and not being integrated with the primary ESD 314.

Figures 1, 4:
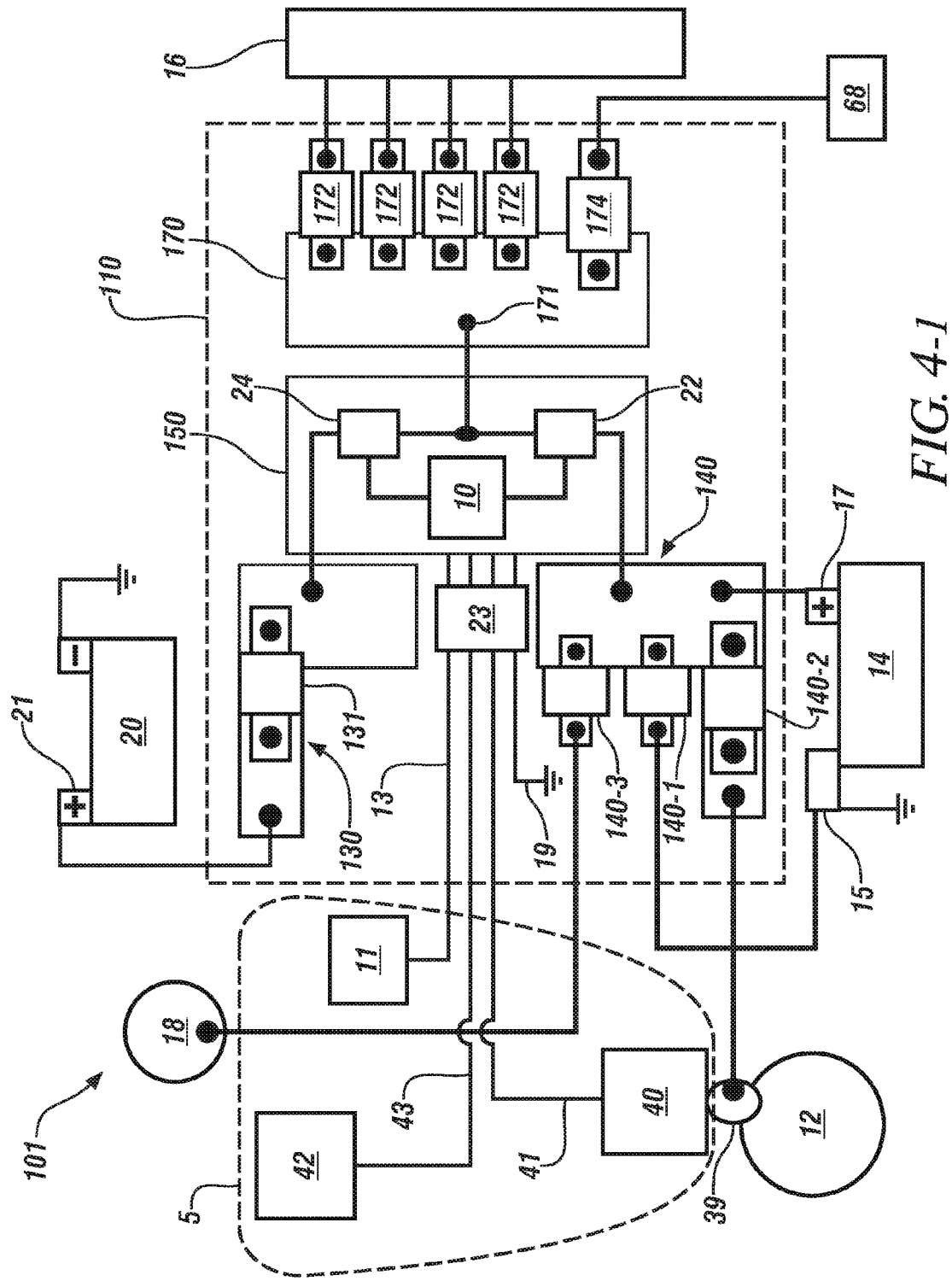
Figures 2, 4:
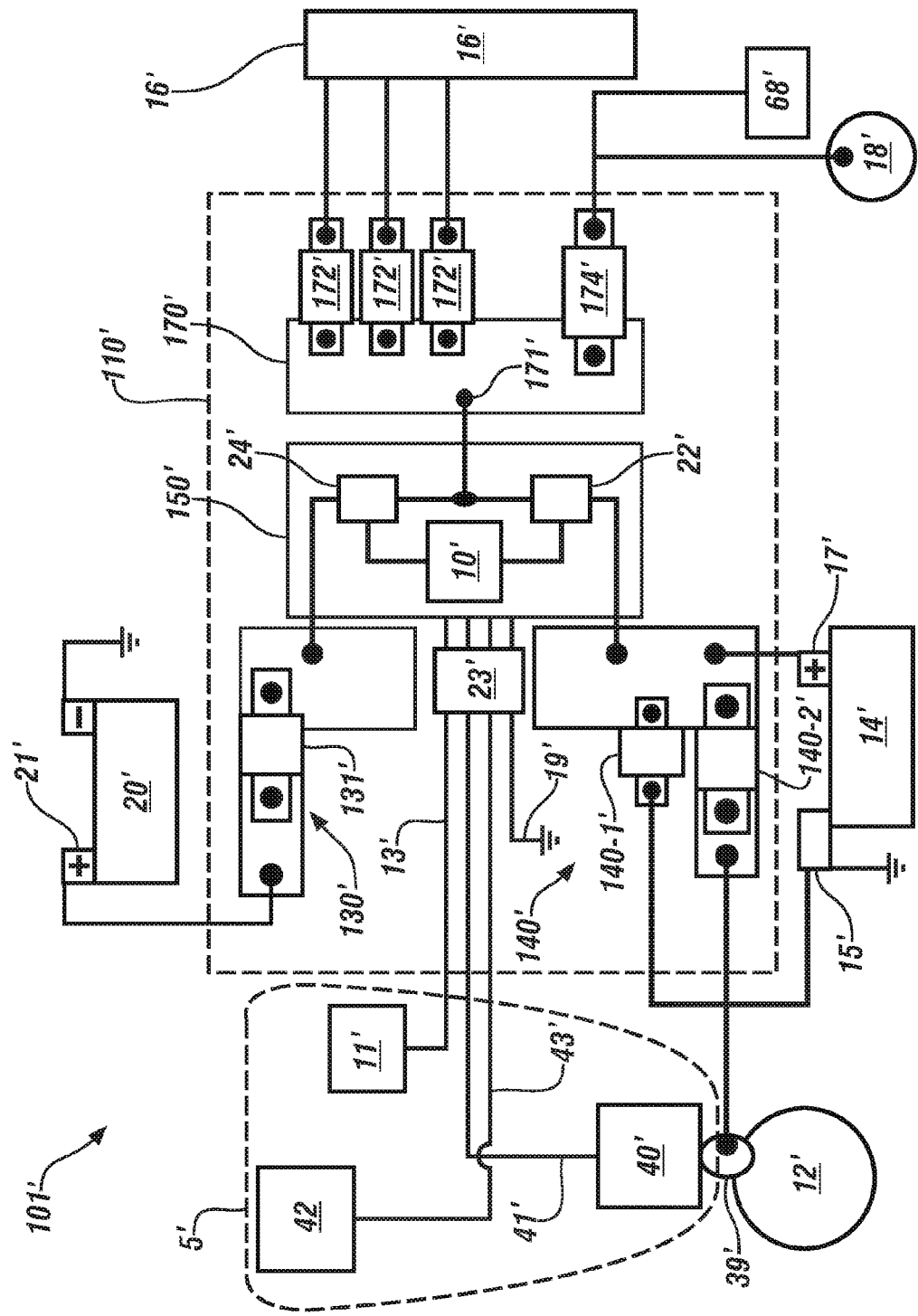

FIG. 4-1 schematically illustrates a battery isolator controller (BIC) 101 utilized for voltage stabilization during an engine autostart event for a vehicle. It will be appreciated that the BIC 101 is located within the vehicle that further includes at least an engine and a transmission. The vehicle may further include a motorized pump for providing pressured hydraulic fluid to the transmission when the engine is off. The engine starting event may correspond to either one of an engine autostart event and a key-on engine start event. As used herein, the term "engine autostart event" refers to the engine being started after the engine has been momentarily stopped and unfueled by an electronic engine control module (ECM) under specific driving conditions, such as when the vehicle is stopped at a stop light and a brake pedal is depressed. The engine autostart event can be initiated when vehicle motion is desired. As used herein, the term "key-on engine starting event" refers to the engine being started for the first time after the engine has been stopped and unfueled for an extended period of time during a key off event. This disclosure will be directed toward the engine starting event corresponding to the engine autostart event; however, it will be understood that embodiments herein can be equally applied to the engine starting event corresponding to the key-on engine starting event. While the term "battery" is utilized, it will be appreciated that the BIC 101 is applicable to any type of energy storage device. The BIC 101 includes a battery distribution module (BDM) 110, a primary electrical energy storage device (ESD) 14, an auxiliary ESD 20, an ignition module 11, a starter motor 12, a generator 18, an electro-hydraulic transmission pump module 42, a starter solenoid module 40, a starter solenoid 39 and a bussed electrical center (BEC) module 68. While the ignition, electro-hydraulic transmission pump and starter solenoid modules 11, 42, 40, respectively, are depicted as separate modules in the illustrated embodiment, it will be understood that modules 11, 42, 40 may all be integral to an engine control module 5. The BDM 110 includes a plurality of BDM components including an auxiliary fuse terminal 130, a primary fuse terminal 140, a switch device module 150, and a load module 170. The load module 170 manages electrical power distribution from the primary and auxiliary ESDs 14, 20, respectively, to one or more auxiliary loads 16 of the vehicle each coupled to corresponding ones of fuses 172 of the load module 170. The BEC module 68 is electrically coupled to a corresponding fuse 174 of the load module 170 and manages power to loads requiring smaller currents than the one or more auxiliary loads 16 of the vehicle connected to the BDM 110. In some embodiments, the BEC module 58 can direct power to a plurality of electrical centers for managing smaller loads. For instance, the BEC module 68 can direct power to electrical centers located in the front, rear and trunk of the vehicle.

The switch device module 150 of the BDM 110 includes a controller 10, a first switch device 22, and a second switch device 24. As used herein, the term "controller" refers to a processing device. Accordingly, the terms "controller" and "processing device" will be used interchangeably herein. A second terminal of the first switch device 22 is electrically coupled to a positive terminal 17 of the primary ESD 14 via the primary fuse terminal 140. In the illustrated non-limiting embodiment, the second terminal of the first switch device 24 is a source terminal. Hereinafter, the "second terminal" will be interchangeably referred to as the "source" of the first switch device 22. The primary fuse terminal 140 includes three fuses, wherein a first fuse 140-1 is electrically coupled to an integrated battery sensor (IBS) 15 on the primary ESD 14, a second fuse 140-2 is electrically coupled to the starter motor 12 and a third fuse 140-3 is electrically coupled to the generator 18. A first terminal of the first switch device 22 is electrically coupled to a positive terminal 171 of the load module 170. In the illustrated non-limiting embodiment, the first terminal of the first switch device 22 is a drain terminal. Hereinafter, the "first terminal" will be interchangeably referred to as the "drain" of the first switch device. When the first switch device 22 is closed, the primary ESD 14 is electrically coupled to the load module 170 with a very low resistance (e.g., less than 1 milliohm). A second terminal of the second switch device 24 is electrically coupled to the positive terminal 171 of the load module 170. In the illustrated non-limiting embodiment, the second terminal of the second switch device 24 is a source terminal. Hereinafter, the "second terminal" will be interchangeably referred to as the "source" of the second switch device 24. A first terminal of the second switch device 24 is electrically coupled to a positive terminal 21 of the auxiliary ESD 20 via the auxiliary fuse terminal 130. In the illustrated non-limiting embodiment, the first terminal of the second switch device 24 is a drain terminal. Hereinafter the "first terminal" will be interchangeably referred to as the "drain" of the second switch device. The auxiliary fuse terminal 130 includes a first fuse 131 electrically coupled to the auxiliary ESD 20. When the second switch device 24 is closed, the auxiliary ESD 20 is electrically coupled to the load module 170. In other embodiments, the first terminals can correspond to source terminals and the second terminals can correspond to drain terminals.

Each of the ESDs 14 and 20 can include low voltage (e.g., 12 volts) batteries having respective negative terminals grounded, wherein, in a non-limiting exemplary embodiment, the primary ESD 14 is configured to deliver at least 70 ampere-hours and the auxiliary ESD 20 is configured of delivering around 10 ampere-hours. The primary ESD 14 is capable of providing electrical energy for multiple engine starts and standby loads during key off events over extended periods of time. Additionally, the primary ESD 14 can provide electrical energy for peak loads in excess of the generator's 18 output. The primary ESD 14 supplies electrical power to the starter motor 12 during engine starts to crank the engine. The primary ESD 14 additionally supplies electrical power to the load module 170 during normal engine operation and in the presence of an engine autostop condition. As will become apparent, the primary ESD 14 and the starter motor 12 are decoupled/disconnected from the load module 170 via opening of the first switch device 22 during engine cranking events, e.g., an engine autostart. The first switch device 22 is never opened until the second switch device 24 is closed. Prior to, and during, the engine autostart event to crank the engine, the auxiliary ESD 20 is electrically coupled/connected to the load module 170 via closing of the second switch device 24. It is desirable to charge the auxiliary ESD 20 immediately after the engine autostart via maintaining the second switch device 24 closed for a predetermined period of time to maintain a fully charged condition of the auxiliary ESD 20. After the predetermined period of time, the auxiliary ESD 20 maintains the fully charged condition by disconnecting it from the load module 170 via opening of the second switch device 24. The auxiliary ESD 20 is capable of supplying electrical energy to auxiliary vehicle loads 16 during engine start events for a predetermined period of time and maintaining the auxiliary vehicle load voltage within predetermined levels.

The controller 10 is configured to control opening and closing of the first and second switch devices 22, 24, respectively, based on Ignition, Start_ON, and Auto_Stop signals 13, 41, 43, respectively, received by the controller 10 via a signal connector 23 of the switch device module 150. In one embodiment, the signals 13, 41 and 43 may be generated by the ECM 5. The controller 10, e.g., logic, of the switch device module 150 further receives a ground signal 19. In one embodiment, each of signals 13, 41, 43 and 19 are each received at a corresponding terminal of the signal connector 23 via a corresponding wire. The ignition signal 13 is provided by the ignition module 11 and indicates whether the state of the vehicle is ON, e.g., a Key ON condition, or OFF, e.g., a Key OFF condition. The ignition signal 13 is active when the vehicle key-ON condition is present.

When the Start_ON signal 41 is active, the engine starting event, including either one of the engine autostart event or key-on engine starting event, is indicated. The Start_ON signal 41 when active, is operative to close the second switch device 24 in series with the auxiliary ESD 20, and only after the second switch device 24 is closed, allow the first switch device 22 in series with the primary ESD 14 to open in case the voltage of the primary ESD 14 falls below the auxiliary ESD 20. In a non-limiting exemplary embodiment, the first switch device 22 is opened within 5 milliseconds from when the second switch device 24 has been closed. It will be appreciated that the second switch device 24 is closed within a predetermined delay since initiation of the active Start_ON signal 41. The predetermined delay can be referred to as a maximum predetermined period of time. In a non-limiting example, the predetermined delay is 2.0 milliseconds. The Start_ON signal 41 is determined from a state signal from the starter solenoid module 40. In one embodiment, the Start_ON signal 41 is active when the state signal of the starter solenoid module 40 is ON and the Start_ON signal 41 is not active when the state signal of the starter solenoid module 40 is OFF. When the Start_ON signal 41 is not active, e.g., an inactive Start_ON signal 41, the engine starting event is complete. It will be appreciated that when the state signal of the starter solenoid module 40 is OFF, the solenoid 39 of the starter motor 12 is deactivated because it is not desirable to start the engine. Likewise, when the state signal of the starter solenoid module 40 is ON, the solenoid 39 of the starter motor 12 is activated because it is desirable to start the engine. Accordingly, utilizing the state signal from the starter solenoid module 40 allows for the Start_ON signal 41 to be determined without having to obtain an additional signal from an engine control module indicating the autostart event of the engine. One having ordinary skill in the art recognizes that additional costs would be incurred if the engine control module were required to send a signal indicating the autostart event to the controller 10, e.g., logic, of the switch device module 150.

The Auto_Stop signal 43 is determined from a state signal from the electro-hydraulic transmission pump module 42 (hereinafter "pump module 42"). It will be appreciated that when the state signal of the pump module 42 is ON, an electric motor driven pump configured to supply pressurized hydraulic fluid to a transmission of the vehicle is to be turned on when the engine is off. Accordingly, when the state signal of the pump module 42 is ON and active, the Auto_Stop signal 43 is also active to indicate an autostop of the engine. The Auto_Stop signal 43, when active, is operative to open the second switch device 24 in series with the auxiliary ESD 20. Similarly, the Auto_Stop signal 43 is not active when the state signal of the electro-hydraulic transmission pump module 42 is OFF. In vehicles not equipped with an electro-hydraulic transmission pump, and thus, not having an electrically driven pump module, the Auto_Stop signal 43 can be obtained directly from an engine control module.

FIG. 4-2 schematically illustrates another exemplary BIC 101' utilized for voltage stabilization during an engine starting event, in accordance with the present disclosure. Like numerals of the BIC 101' in the illustrated embodiment of FIG. 4-2 correspond to like numerals of the BIC 101 of FIG. 4-1. In contrast to the generator 18 of the BIC 101 of FIG. 4-1 being electrically coupled to the first fuse of the primary fuse terminal, the generator 18' in the illustrated embodiment of FIG. 4-2 is electrically coupled to the fuse 174 of the load module 170. Accordingly, the third fuse 140-3 of the BIC 101 of FIG. 4-1 is not included in the BIC 101' in the illustrated embodiment of FIG. 4-2. The BICs 101 and 101' are non-limiting, and the embodiments herein can be carried out utilizing either of the BICs 101 or 101'.

This disclosure will refer to the BDM 110 of FIG. 4-1 for simplicity; however, the embodiments disclosed herein are equally applicable to the BDM 110' of FIG. 4-2. The switch devices 22 and 24 can be solid-state power devices mounted on bus-bars serving to distribute and dissipate the heat generated by the switches when carrying electrical current. The controller 10, e.g., logic, of the switch device module 150 can include, or otherwise be integrated on, a PC board attached directly to—or in close proximity—to the switch devices 22 and 24 to minimize wiring. For instance, the PC board may be attached using snap mounting features, solderless press-fit terminals, stand-off terminals, headers and sockets, and soldered terminals. The controller 10 for the switch devices 22 and 24 and the signal connector 23 receives the vehicle signals (e.g., Ignition 13, Start_ON 41, Auto_Stop 43 and ground 19) described above with reference to FIG. 4-1 and in further detail below with reference to the switch device module 150 of FIG. 7. The known pre-fuse center 193 described above with reference to FIGS. 1-1 and 1-2, does not include any controller configured to receive vehicle signals to operate the external isolator 301 between the corresponding open and closed states.

In the illustrated embodiment, the BDM 110 is integrated directly on top of the primary ESD 14, and the BDM 110 including the controller is utilized in place of the known pre-fuse center 193 described above with reference to FIGS. 1-1 and 1-2. In one embodiment, the BDM 110 is attached on top of the primary ESD using snap mounting features. Additionally, the BDM 110 integrates the controller 10 and the switch devices 22 and 24. In contrast, the external isolator 301 of the known battery isolator circuit 300 described above with reference to FIGS. 2 and 3, is external to the pre-fuse circuit 193. Thus, the external isolator 301 is not integrated with the pre-fuse circuit. Embodiments herein are directed toward integrating the BDM 110, including the controller 10 and switch devices 22 and 24 of the switch device module 150, directly on top of the primary ESD 14 to enable stabilized voltage to be provided to the one or more auxiliary loads 16 during an engine start event by opening the first switch device 22 after the second switch device 24 has been closed based on at least one of the received Ignition, Start_ON, and Auto_Stop signals 13, 41, 43, respectively. Integration of the BDM 110 directly on top of the primary ESD 14 is described in further detail below with reference to FIG. 6.

Figure 5:
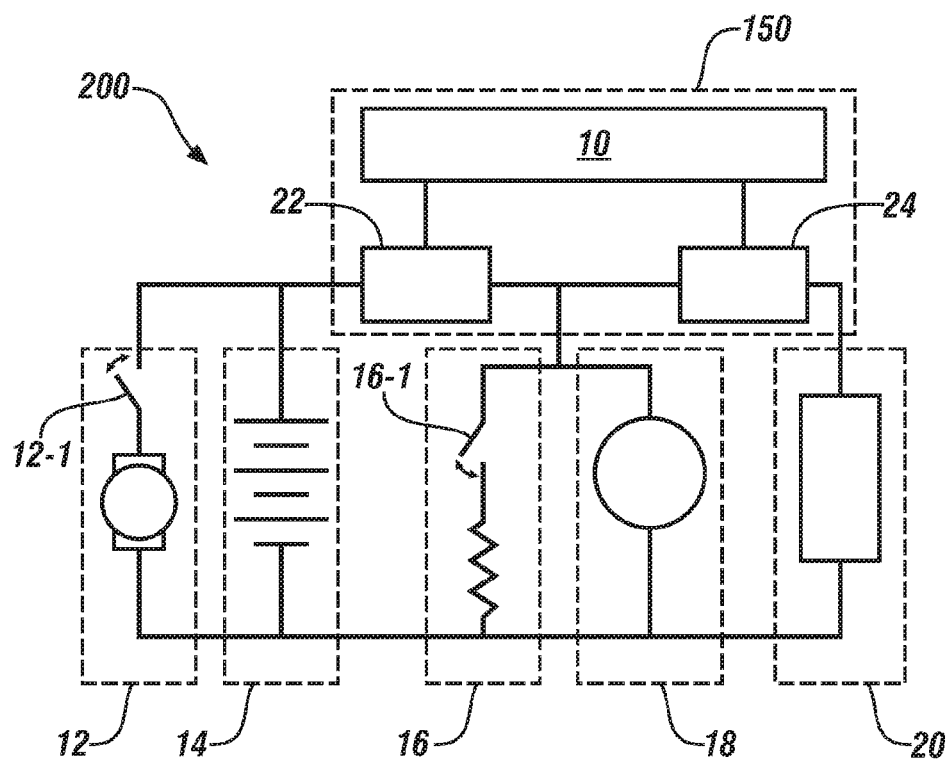
FIG. 5 illustrates an exemplary battery isolator circuit corresponding to the battery isolator controllers of FIGS. 4-1 and 4-2, in accordance with the present disclosure.

FIG. 5 illustrates an exemplary battery isolator circuit 200 corresponding to the battery isolator controller 101, 101' of FIGS. 4-1 and 4-2, in accordance with the present disclosure. The battery isolator circuit (IC) 200 includes the controller 10, the first switch device 22 and the second switch device 24 of the switch device module 150, and an electrical power bus including the starter motor 12, the primary ESD 14, auxiliary loads 16, the generator 18, and the auxiliary ESD 20. In the illustrated embodiment, the primary ESD 14 can be referred to as a cranking battery and the auxiliary ESD 20 can be referred to as a secondary ESD. The auxiliary loads 16 can include one or more loads of the vehicle such as, but not limited to, an air conditioning compressor, vehicle interior lighting, power seat operation, and an entertainment system. The starter motor 12 includes a solenoid switch 12-1 that is closed during engine start events, e.g., the Start_ON signal 41 is active. Each auxiliary load 16 that requires power, may include a respective switch 16-1 so that power to the one or more auxiliary loads 16 can be provided from either one of the primary and auxiliary ESDs 14, 20, respectively, based on whether the first and second switch devices 22, 24, respectively, are open or closed. The auxiliary loads requiring electrical power are normally supplied with electrical power from the generator 18 and the primary ESD 14 when the engine is ON and running within the engine's normal speed range.

Figures 1, 6:
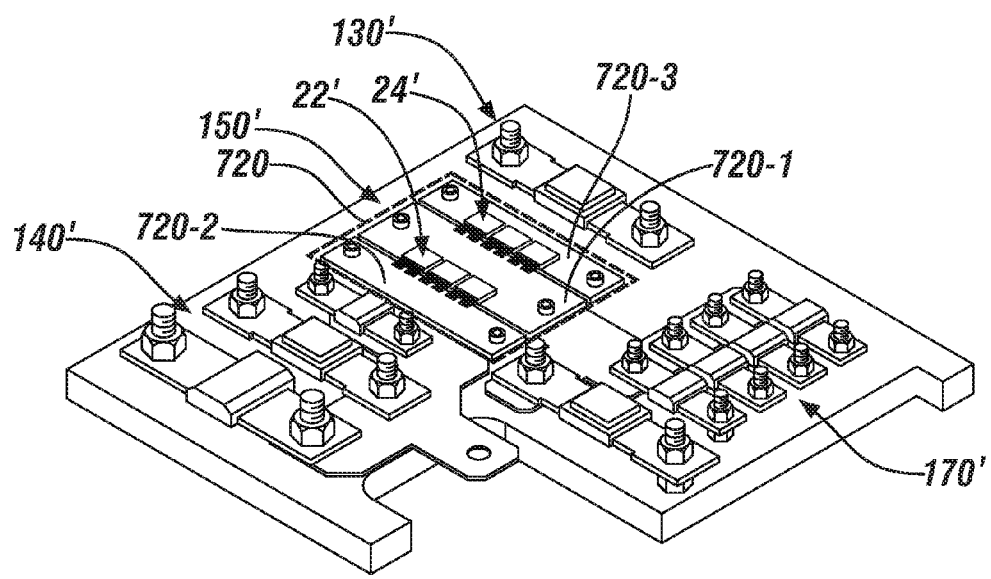
Figures 2, 6:
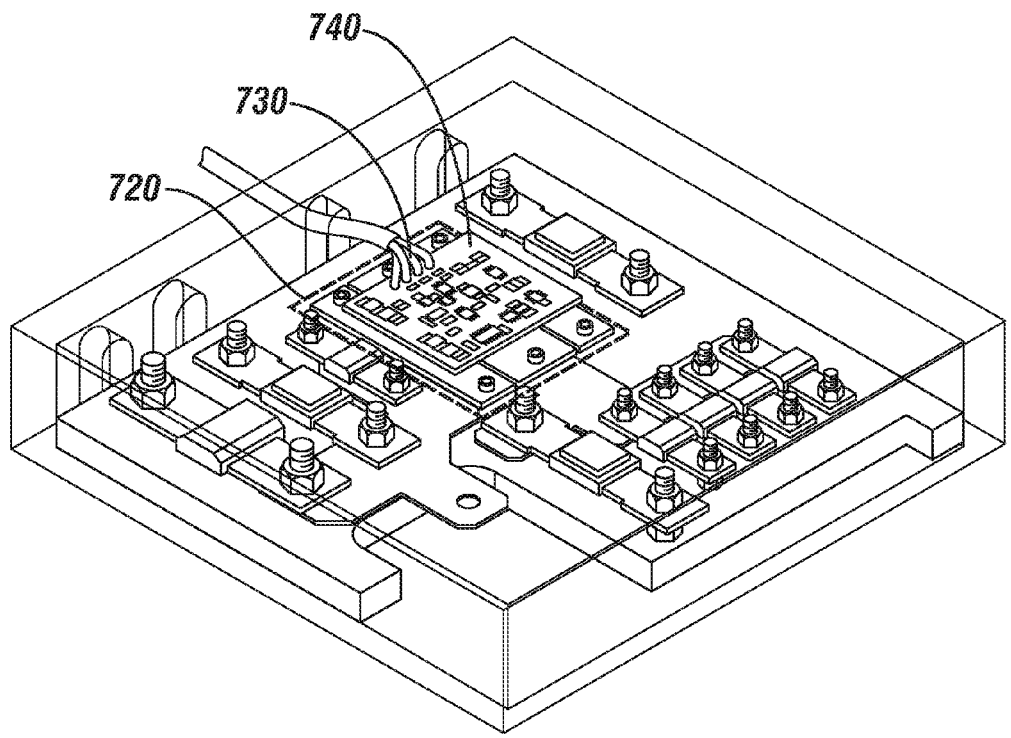
Figures 3, 6:
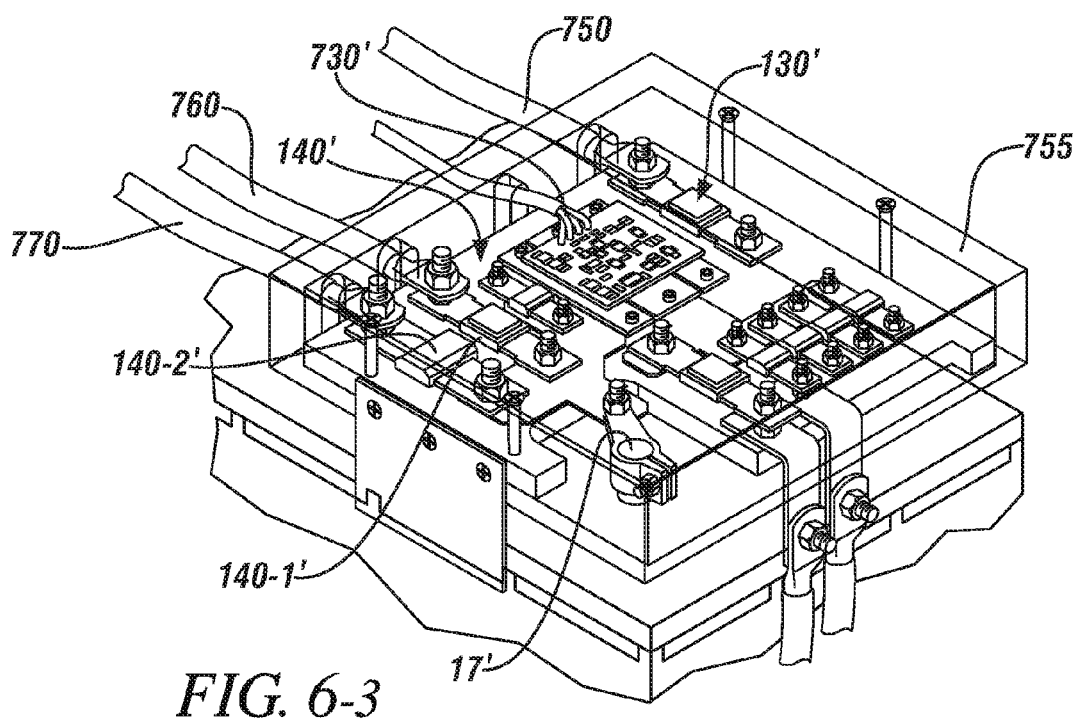
Figures 4, 6:
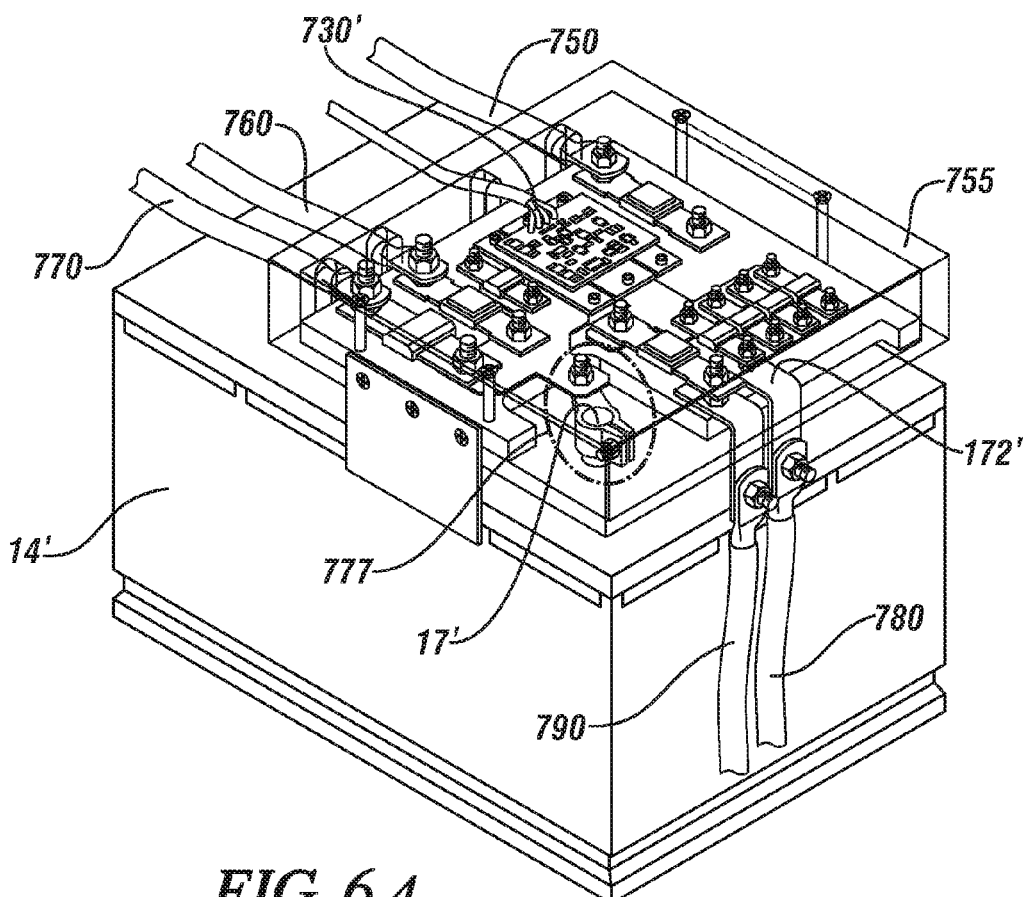

FIGS. 6-1 to 6-4 illustrate assembly of the exemplary BDM 110' of FIG. 4-2, in accordance with the present disclosure. While the FIGS. 6-1 to 6-4 depict assembly of the BDM 110' of FIG. 4-2, the description described for FIGS. 6-1 to 6-4 can be similarly applied for assembly of the BDM of FIG. 4-1.

Referring to FIG. 6-1, the BDM 110' includes an electrical bus assembly 720 including a first electrical bus 720-1, a second electrical bus 720-2 and a third electrical bus 720-3. In the illustrated embodiments of FIGS. 6-1 to 6-4, the electrical bus assembly includes an electrical bus bar assembly and the first, second and third electrical buses 720-1, 720-2 and 720-3 include first, second and third bus bars, respectively. For simplicity, the terms "electrical bus assembly" and "electrical bus" will be hereinafter referred to as a "bus bar assembly" and a "bus bar". However, this disclosure is not limited to the electrical bus assembly including bus bars and may include any conducting devices such as, but not limited to, plates, wires, or cables capable of providing electrical communication between one or more devices, modules, fuses or components of the BDM 110'. The first bus bar 720-1 directly connects to each of a drain of the first switch device 22', a source of the second switch device 24' and the positive terminal 171' of the load module 170'. The first bus bar 720-1 electrically couples the drain of the first switch device 22' to the one or more auxiliary loads 16' and electrically couples the source of the second switch device 24' to the one or more auxiliary loads 16'.

The second bus bar 720-2 directly connects to a source of the first switch device 22'. In one embodiment, the second bus bar 720-2 includes the primary fuse terminal 140' integrated therewith. In another embodiment, the second bus bar 720-2 is directly attached to—and electrically coupled with—the primary fuse terminal 140'. It will be appreciated that the second bus bar 720-2 and the primary fuse terminal 140' is electrically coupled to the first bus bar 720-1 when the first switch device 22' is closed. As will become apparent only when the first switch device 22' is closed, electrical communication exists between the primary ESD 14', the primary fuse terminal 140', the second bus-bar 720-2 and the load module 170' such that the primary ESD 14' can be electrically coupled to the one or more auxiliary loads 16'.

The third bus bar 720-3 directly connects to a drain of the second switch device 24'. In one embodiment, the third bus bar 720-3 includes the auxiliary fuse terminal 130' integrated therewith. In another embodiment, the third bus bar 720-3 is directly attached to—and electrically coupled with—the auxiliary fuse terminal 130'. It will be appreciated that the third bus bar 720-3 and the auxiliary fuse terminal 130' are electrically coupled to the first bus bar 720-3 when the second switch device 24' is closed. As will become apparent only when the second switch device 24' is closed, electrical communication exists between the auxiliary ESD 20', the auxiliary fuse terminal 130', the third bus-bar 720-3 and the load module 170' such that the auxiliary ESD 20' can be electrically coupled to the one or more auxiliary loads 16'.

Referring to FIG. 6-2, assembly of the BDM 110' further includes a PC board 740 that includes the controller 10' of the switch module 150' integrated directly with the switch devices 22 and 24 and the electric bus bar 720. As used herein, the term "integrated directly" refers to the PC board 740 including a plurality of layers interconnected using standard printing circuit board techniques, wherein each layer corresponds to respective ones of the switch devices 22' and 24', the controller 10' and the bus bar assembly (e.g. electrical bus assembly) 720. Thus, the PC board 740 including the controller 10' is integrated with the switch devices 22' and 24' and the bus bar assembly 720. In one embodiment, the signal connector 23' of the controller 10' illustrated in FIG. 4-2, includes a plurality of terminals each configured to receive a corresponding one of the Ignition, Start_ON, Auto_Stop and ground signals 13, 41, 43, 19 respectively. In the illustrated embodiment, each of the signals 13, 41, 43, 19 may be transmitted to the PC board 740 that includes the controller 10' via corresponding ones of a plurality of wires 730.

Referring to FIG. 6-3, assembly of the BDM 110' further includes providing an auxiliary wire 750 to electrically couple the auxiliary fuse terminal 130' and the drain of the second switch device 24 to the positive terminal 21' of the auxiliary ESD 20'. An Intelligent Battery Sensor (IBS) wire 760 is provided to electrically couple the IBS 15' on the primary ESD 14' to the first fuse 140-1' of the primary fuse terminal 140'. A starter motor wire 770 is provided to electrically couple the starter motor 12 to the second fuse 140-2' of the primary fuse terminal 140'. Protective casing 755 protects the BDM 110'. The positive terminal 17' of the primary ESD 14' is further illustrated.

Referring to FIG. 6-4, assembly of the BDM 110' further includes integrating the BDM 110' directly with the primary ESD 14', wherein the primary fuse terminal 140' is directly attached to—and electrically coupled with—the positive terminal 17' of the primary ESD 14. The primary fuse terminal 140' is electrically coupled to the positive terminal 779 of the primary ESD 14' within area 777. Specifically, a connection point of the primary fuse terminal 140' is directly attached to the positive terminal 17' of the primary ESD 14' to electrically couple the positive terminal 17' of the primary ESD 14' to the source of the first switch device 22' and the starter motor. In the illustrated embodiment, the primary fuse terminal 140' is directly attached to the positive terminal 17' of the primary ESD 14' using clamp-on or press-fit mounting features. Thus, the BDM 110' including the integrated switch module 150' is integrated directly on top of the primary ESD 14'. It will be appreciated that the primary fuse terminal 140' provides continuous uninterrupted electrical coupling between the primary ESD 14' and the starter motor such that the primary ESD 14' may supply electrical power to the starter motor during engine start events for cranking the engine. It will be further appreciated that the primary fuse terminal 140' provides electrical coupling between the primary ESD 14' and the load module 170' only when the first switch device 22' is closed such that the primary ESD 14' may supply electrical power to the one or more auxiliary loads 16'.

FIG. 6-4 further depicts the auxiliary wire 750, the IBS wire 760, and the starter motor wire 770 as described above with reference to FIG. 6-3. Additionally, a load wire 780 is provided to electrically couple one of the auxiliary loads 16' to the corresponding fuse 172' of the load module 170'. A BEC wire 790 is provided to electrically couple the corresponding fuse 174' of the load module 170' to the BEC module 68' that manages power to loads requiring smaller currents than the one or more auxiliary loads 16' of the vehicle. While not explicitly depicted in FIG. 6-4, a generator wire can be provided to electrically couple the generator 18' to the corresponding fuse 174' of the load module 170'.

Figure 7:
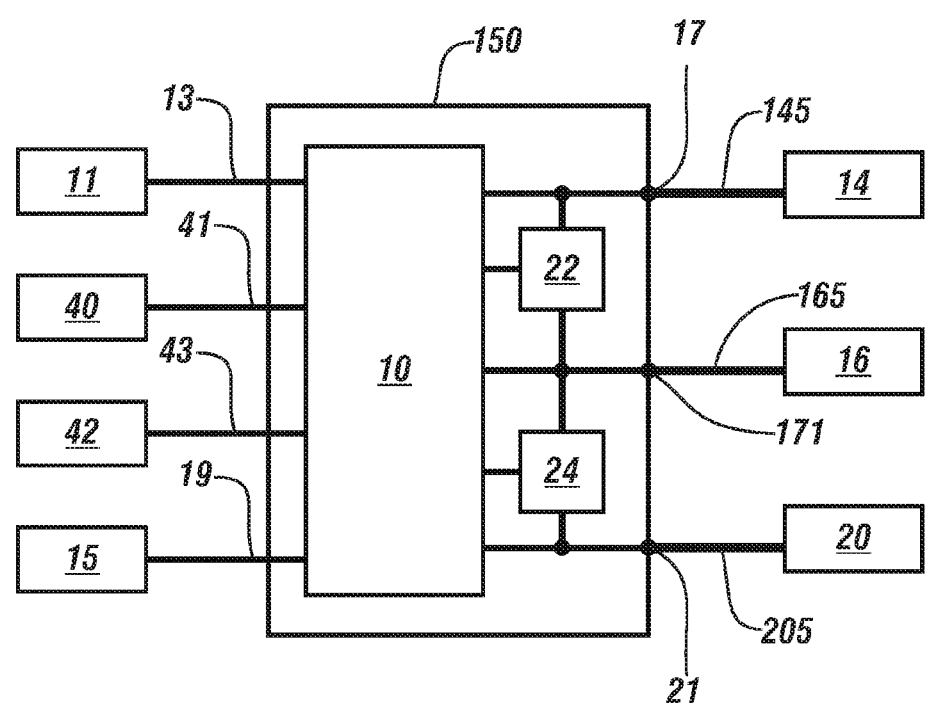
FIG. 7 illustrates input and output signals to a switch device module 150, 150' of a battery distribution module 110, 110' of FIGS. 4-1 and 4-2, in accordance with the present disclosure.

FIG. 7 illustrates input and output signals to the switch device module 150, 150' of the battery distribution module 110, 110' of FIGS. 4-1 and 4-2, in accordance with the present disclosure. The controller 10, e.g., logic, receives the Ignition signal 13 from the ignition module 11, the Start_ON signal 41 from the starter solenoid module 40, the Auto-Stop signal 43 from the pump module 42 and the ground signal 19 from a ground module 15. The controller 10 further monitors primary ESD voltage via signal 145 provided from the primary ESD 14, auxiliary load voltage via signal 165 provided from the one or more auxiliary loads 16 and auxiliary ESD voltage via signal 205 provided form the auxiliary ESD 20. It will be understood that each of the primary ESD 14, the one or more auxiliary loads 16 and the auxiliary ESD 20 may included integrated sensors configured to measure the corresponding voltages. It will further be understood that the load module 170 may include an integrated sensor configured to measure the corresponding voltage of the one or more auxiliary loads 16. Based on at least one of the Ignition signal 13, the Start_ON signal 41 and the Auto-Stop signal 43, opening and closing of the first and second switch devices 22, 24, respectively, is controlled. The first switch device 22 is operative to electrically couple the primary ESD 14 and a contractor of the starter motor 12 to a positive terminal of the one or more auxiliary loads 16 when closed. Specifically, the first switch device 22 when closed, electrically couples the primary ESD 14 and a contractor of the starter motor 12 to the positive terminal 171 of the load module 170, wherein the load module 170 manages electrical power distribution to the one or more auxiliary loads 16. When opened, the first switch device 22 is operative to disconnect and decouple the primary ESD 14 (and the starter motor contractor) from the one or more auxiliary loads 16.

The first switch device 22 is operative to open within a short first predetermined period of time (e.g., 10 microseconds) after the Start_ON signal 41 first went active when cranking voltage at the positive terminal of the primary ESD 14 drops by a predetermined magnitude below a monitored voltage of the auxiliary ESD 20. The controller 10 never allows the first switch device 22 to open unless the second switch device 24 is closed, wherein the second switch device 24 must be closed within a maximum predetermined period of time (e.g., predetermined delay of 2 milliseconds) upon the Start_ON signal 41 first going active and received by the controller 10. Thus, the first switch device 22 opens within the first predetermined period of time after the Start_ON signal 41 first went active and after the second switch device 24 has been closed. Thereafter, the first switch device 22 remains open until one or more predetermined conditions have occurred. In one embodiment, the first switch device 22 is transitioned to close when the predetermined condition occurs in response to the voltage of the primary ESD 14 exceeding the voltage of the one or more auxiliary loads 16 by a predetermined magnitude. In another embodiment, the first switch device 22 is transitioned to close when the predetermined condition occurs in response to a second predetermined period of time has elapsed from when the Start_ON signal 41 went active. In this embodiment, the second predetermined period of time must elapse even if the voltage of the primary ESD 14 has exceeded the voltage of the one or more auxiliary loads 16 by the predetermined magnitude prior to the second predetermined period of time elapsing. In yet another embodiment, the first switch device 22 is transitioned to close when the predetermined condition occurs in response to the Start_ON signal 41 no longer being active, e.g., inactive. The inactive Start_ON signal 41 indicates completion of the engine starting event. Embodiments herein are directed toward having the first switch device 22 self bias on current draws greater than 5 amps and remain unbiased for current draws less than 100 milliamps. The second switch device 24 is operative to electrically couple the auxiliary ESD 20 to the positive terminal (e.g, positive terminal 171 of load module 170) of the one or more auxiliary loads 16 when closed.

As aforementioned, the second switch device 24 must be closed within the predetermined delay (also referred to as the "maximum predetermined period of time) after the Start_ON signal 41 goes active. It will be appreciated that in response to the Start_ON signal 41 going active, there is a time delay associated with actuating the starter control solenoid 39, wherein the time delay of the starter control solenoid 39 closing the contractor of the starter motor 12 exceeds the predetermined delay. Accordingly, the second switch device 24 must be closed within the predetermined delay to electrically couple the auxiliary ESD 20 with the one or more auxiliary loads 16 prior to the starter control solenoid 39 being activated. In a non-limiting example, the predetermined delay is 2 milliseconds. When opened, the second switch device 24 is operative to disconnect and decouple the auxiliary ESD 20 from the one or more auxiliary loads 16. The second switch device 24 may transition from closed to opened when either one of the Auto_Stop signal 43 is active, the Ignition signal 13 is inactive or a predetermined inactive period of time has elapsed since the Start_ON signal 41 has gone inactive. It will be appreciated that the inactive Ignition signal 13 indicates the Key OFF condition wherein the state of the vehicle is OFF and the active Auto_Stop signal 43 indicates initiation of an engine autostop event.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 0.100, 1.0, 3.125, 6.25, 12.5, 25 and 100 milliseconds during ongoing engine and vehicle operation. Alternatively, routines may be executed in response to occurrence of an event.

Figure 8:
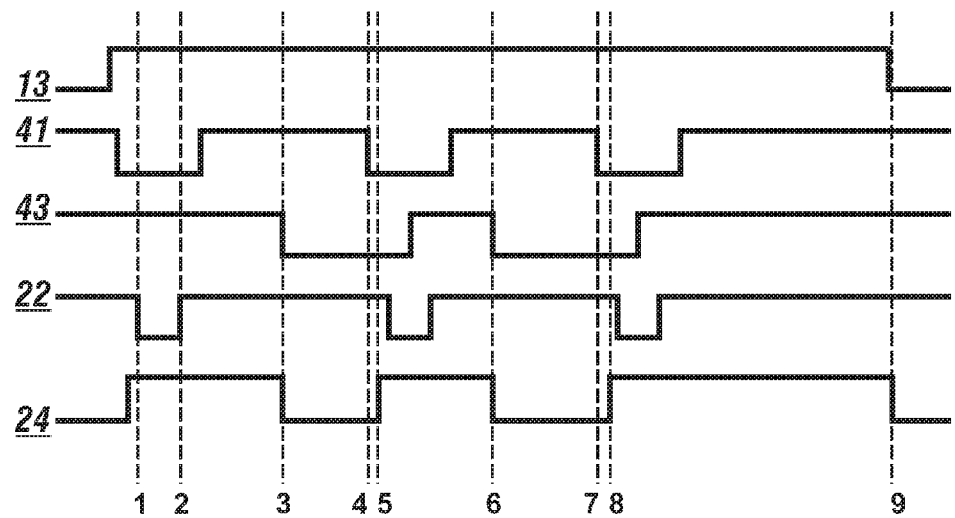
FIG. 8 illustrates an exemplary first logic of opening and closing time responses of first and second switch devices of the switch device module 150, 150' of FIG. 7 through a plurality of autostart and autostop events, in accordance with the present disclosure.

FIG. 8 illustrates a non-limiting exemplary first logic of opening and closing time responses of the first and second switch devices 22, 24, respectively, of FIG. 7 through a plurality of autostart and autostop events, in accordance with the present disclosure. Each of the ignition signal 13, the Start_ON signal 41, the Auto_Stop Signal 43, the first switch device signal 22 and the second switch device signal 24 are bi-level signals operative at either one of a low level and a high level. With respect to the ignition signal 13, a low level indicates the ignition signal 13 is not active corresponding to a vehicle Key OFF condition and a high level indicates the ignition signal 13 is active corresponding to a vehicle Key ON condition. With respect to the Start_ON signal 41, a high level indicates the Start_ON signal 41 is not active corresponding to no engine autostart event and a low level indicates the Start_ON signal 41 is active corresponding to an engine autostart event. With respect to the Auto_Stop signal 43, a high level indicates the Auto_Stop signal 43 is not active corresponding to no autostop event and a low level indicates the Auto_Stop signal 43 is active corresponding to an autostop event of the engine. With respect to the switches 22 and 24, high levels indicate the switches 22 and 24 are closed and low levels indicate the switches 22 and 24 are open. Dashed vertical lines 1-9 indicate various time events.

When the ignition signal 13 is inactive and the vehicle is in a Key OFF condition, the first switch device 22 is kept closed so that the primary ESD 14 is electrically connected to the one or more auxiliary loads 16. The first switch device 22 remains closed until an engine cranking event indicated by an active Start_ON signal 41 is received by the controller 10. Specifically, the first switch device 22 is opened at dashed vertical line 1, the first predetermined period of time after the Start_ON signal 41 first became active, e.g., the autostart event of the engine is initiated. It will be understood that initiation of the autostart event indicates initiation of the engine cranking event. Further, the first switch device 22 only opens within a predetermined period of time after the second switch device 24 has been closed. The second switch device 24 is closed, prior to dashed vertical line 1, when both the ignition signal 13 is active and the Start_ON signal 41 is active. Specifically, the second switch device 24 must be closed within the predetermined delay after the Start_ON signal 13 goes active. In a non-limiting example, the predetermined delay is 2 milliseconds. For instance, the Start_ON signal 41 goes active at dashed vertical line 4 and the second switch device 24 is closed at dashed vertical line 5, wherein the predetermined delay is represented by the period of time between dashed vertical lines 4 and 5. Further, the first switch device 22 is opened after dashed vertical line 5 after the second switch device 24 has been closed. Similarly, the Start_ON signal 41 goes active at dashed vertical line 7 and the second switch device 24 is closed at dashed vertical line 8, wherein the predetermined delay is represented by the period of time between dashed vertical lines 7 and 8. Further, the first switch device 22 is opened after dashed vertical line 8 after the second switch device 24 has been closed which is no later than the closing of the contractor of the starter motor 12.

Further embodiments may include opening the first switch device 22 when both the Ignition signal 13 is active and voltage of the primary ESD 14 is less than voltage of the one or more auxiliary loads 16 by a second predetermined magnitude of voltage. In a non-limiting example, the predetermined magnitude of voltage is 50 mV. The predetermined magnitude of voltage associated with opening the first switch device 22 can include a different value than that of the predetermined magnitude of voltage associated with the predetermined condition for closing the first switch device 22. The second switch device 24 must be closed by the controller 10 prior to opening the first switch device 22. As aforementioned, the first switch device 22 remains opened unless one or more of the predetermined conditions are met and the engine has been started. In the illustrated non-limiting exemplary first logic of FIG. 8, the first switch device 22 is opened at dashed vertical line 1 when both the ignition signal 13 is active and voltage of the primary ESD 14 is less than the voltage of the one or more auxiliary loads by the predetermined magnitude of voltage and the first switch device 22 is closed after the engine is started and at least one of the predetermined conditions is met at dashed vertical line 2.

Embodiments of the exemplary first logic of FIG. 8 are further directed toward opening the second switch device 24 when either the Auto_Stop signal 43 is active or the Ignition signal 13 is not active. For instance, at each of dashed vertical lines 3 and 6, the second switch device 24 is opened when the Auto_Stop signal 43 goes active. Likewise, the second switch device 24 is opened when the Ignition signal 13 is no longer active at dashed vertical line 9.

Figure 9:
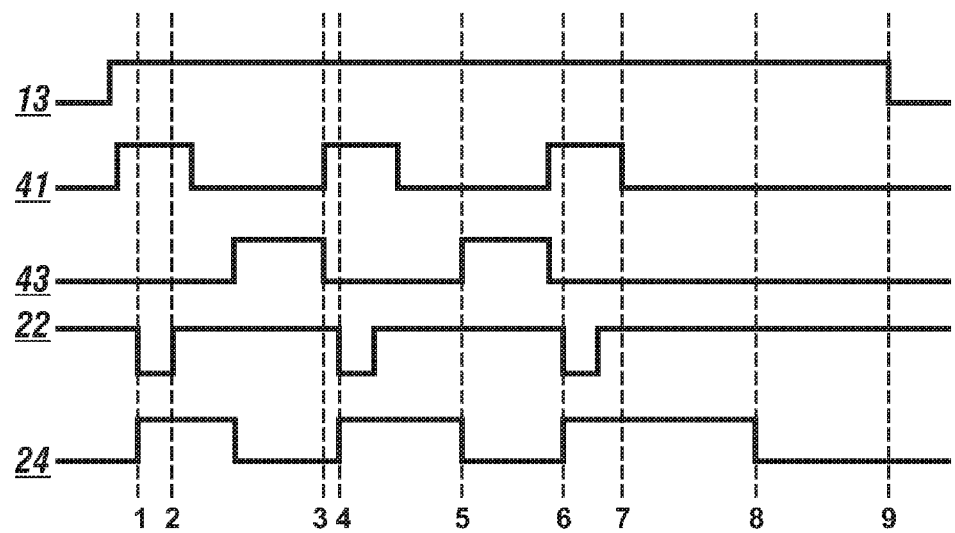
FIG. 9 illustrates an exemplary second logic of opening and closing time responses of first and second switch devices of the switch device module 150, 150' of FIG. 7 through a plurality of autostart and autostop events, in accordance with the present disclosure.

FIG. 9 illustrates a non-limiting exemplary second logic of opening and closing time responses of the first and second switch devices 22, 24, respectively, of FIG. 7 through a plurality of autostart and autostop events, in accordance with the present disclosure. Each of the ignition signal 13, the Start_ON signal 41, the Auto_Stop Signal 43, the first switch device signal 22 and the second switch device signal 24 are bi-level signals operative at either one of a low level and a high level. With respect to the Ignition signal 13, a low level indicates the ignition signal 13 is not active corresponding to a vehicle Key OFF condition and a high level indicates the ignition signal 13 is active corresponding to a vehicle Key ON condition. With respect to the Start_ON signal 41, a high level indicates the Start_ON signal 41 is active corresponding to an engine autostart event and a low level indicates the Start_ON signal 41 is not active corresponding to no engine autostart event. With respect to the Auto_Stop signal 43, a low level indicates the Auto_Stop signal 43 is not active corresponding to no autostop event and a high level indicates the Auto_Stop signal 43 is active corresponding to an autostop event of the engine. With respect to the switches 22 and 24, high levels indicate the switches 22 and 24 are closed and low levels indicate the switches 22 and 24 are open. Dashed vertical lines 1-8 indicate various time events.

In the non-limiting exemplary second logic of FIG. 9, the first switch device 22 is normally kept closed when the Ignition signal 13 is inactive or transitions from inactive to active. In response to the Start_ON signal 41 going active, the second switch device 24 is closed just prior to dashed vertical line 1 within the predetermined delay (e.g., 2 milliseconds). The first switch device 22 is operative to open within the short first predetermined period of time (e.g., 10 microseconds) after the Start_ON signal 41 first going active when cranking voltage applied to the positive terminal of the primary ESD 14 drops by the predetermined magnitude of voltage below that of the one or more auxiliary loads 16. It will be understood that the controller 10 of FIG. 5 is operative to only permit the first switch device 22 to open after the second switch device 24 has been closed. In the illustrated embodiment, the first switch device 22 opens at dashed vertical line 1 the short first predetermined period of time after the Start_ON signal 41 went active and the second switch device 22 has been closed. Likewise, the first switch device 22 opens at dashed vertical line 4, the short first predetermined period of time after the Start_ON signal 41 went active at dashed vertical line 3 and the second switch device 22 has been closed prior to dashed vertical line 4. Similarly, the first switch device 22 opens at dashed vertical line 6, the short first predetermined period of time after the Start_ON signal 41 went active and the second switch device 24 has been closed prior to dashed vertical line 6.

The first switch device 22 remains open until one or more of the predetermined conditions are met. In the illustrated embodiment, the first switch device 22 is transitioned to close at dashed vertical line 2 when one or more of the predetermined conditions are met. In one embodiment, the first switch device 22 is transitioned to close at dashed vertical line 2 when the voltage of the primary ESD 14 exceeds the voltage of the one or more auxiliary loads 16 by the predetermined magnitude. In another embodiment, the first switch device 22 is transitioned to close at dashed vertical line 2 after the predetermined period of time has elapsed since initiation of the active Start_ON signal 41. In this embodiment, even if the voltage of the primary ESD 14 exceeds the voltage of the one or more auxiliary loads by the predetermined magnitude, the first switch device 22 will not transition to close until the second predetermined period of time has elapsed. In yet another embodiment, the first switch device 22 may remain open until the Start_ON signal 41 goes inactive. The inactive Start_ON signal 41 indicates completion of the engine starting event.

Embodiments of the non-limiting exemplary second control logic of FIG. 9 are further directed toward the second switch device 24 closing within the predetermined delay after the Start_ON signal 41 goes active. For instance, the Start_ON signal 41 goes active at dashed vertical line 3 and the second switch device 24 is closed just prior to dashed vertical line 4, wherein the predetermined delay is between dashed vertical line 3 and just prior to dashed vertical line 4. In a non-limiting embodiment, the predetermined delay between dashed vertical line 3 and just prior to dashed vertical line 4 is equal to 2 milliseconds. Moreover, the second switch device 24 is opened based on the earlier one of the Ignition signal 13 going inactive, the Auto_Stop signal 43 becoming active and the predetermined period of time elapsing since the Start_ON signal 13 has gone inactive. Allowing the second switch device 24 to remain closed after the Start_ON signal 41 has become inactive for the predetermined period of time, allows the auxiliary ESD 20 to be fully charged from the now fueled and running engine after being partially depleted from supplying electrical energy to the one or more auxiliary loads 16 during the engine cranking. However, it is desirable to open the second switch device 24 upon being charged so that the auxiliary ESD 20 remains in a fully charged condition so that electrical energy can be supplied to the one or more auxiliary loads 16 during subsequent autostart events of the engine. In the illustrated embodiment of FIG. 9, the second switch device 24 is closed just prior to dashed vertical line 4, and thus, the closing occurs within the predetermined delay after the Start_ON signal goes active at dashed vertical line 3. The second switch device 24 remains closed until the Auto_Stop signal 43 goes active at dashed vertical line 5. Furthermore, the second switch device 24 is closed just prior to dashed vertical line 6, within the predetermined delay after the Start_ON signal 41 goes active. The second switch device 24 remains closed for the predetermined period of time from when the Start_ON signal 41 goes inactive at dashed vertical line 7 until opening at dashed vertical line 8, wherein the predetermined period of time from when the Start_ON signal 41 went inactive is between dashed vertical lines 7 and 8.

Figure 10:
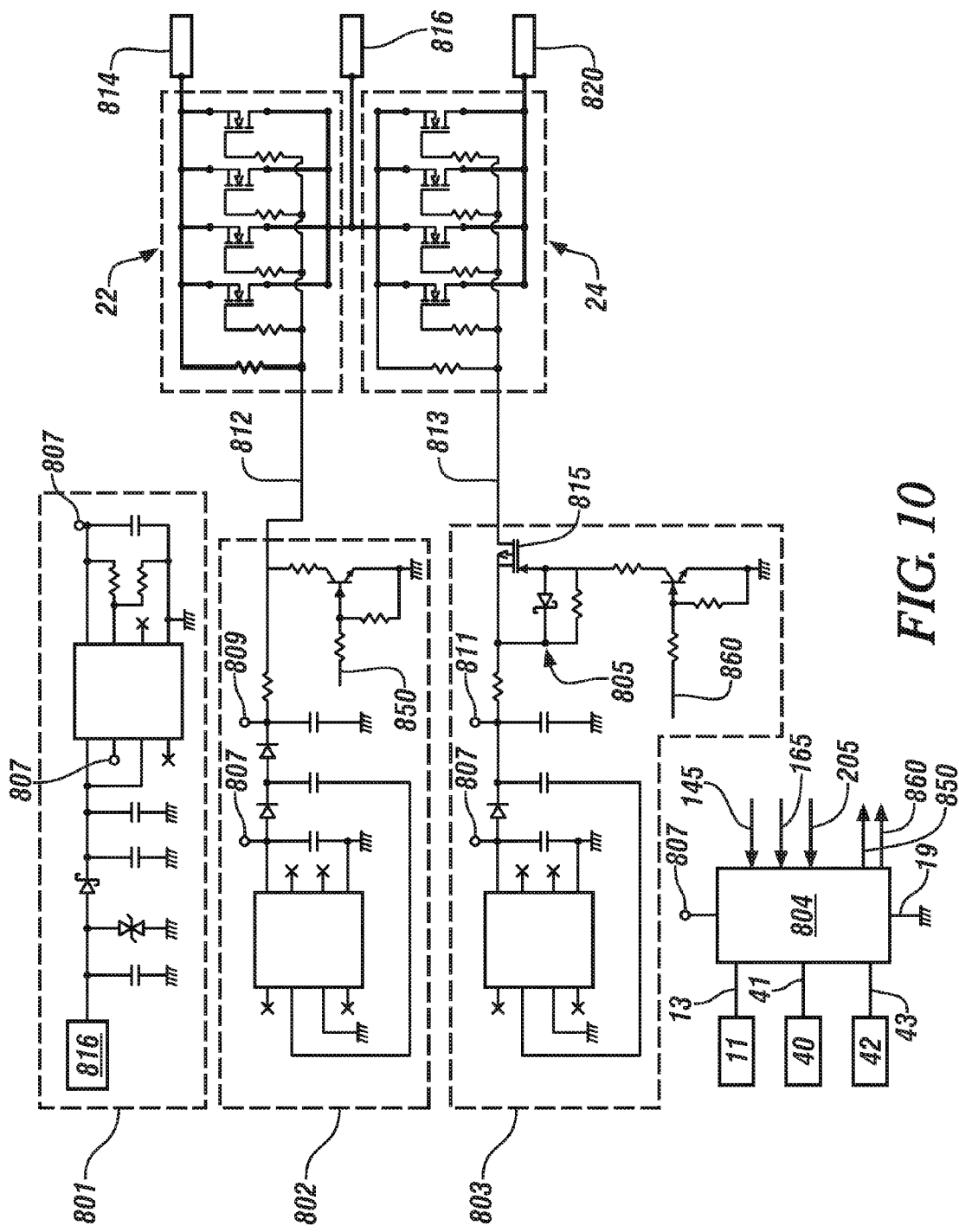
FIG. 10 illustrates an exemplary schematic of the switch device module 150, 150' of FIG. 7, including a bias control circuit 801, a first switch device charge pump circuit 802, a second switch device charge pump circuit 803 and a controller 804, in accordance with the present disclosure.

FIG. 10 illustrates a non-limiting exemplary schematic of the switch device module 150 of FIG. 7, including a bias control circuit 801, a first switch device charge pump/driver circuit 802, a second switch device charge pump/driver circuit 803 and a controller 804, in accordance with the present disclosure. The circuits 801-803 variously include diodes, zener diodes, resistors, amplifiers, capacitors, gates, ground and meters each depicted by their corresponding schematic symbol for common electronics. The bias power supply circuit 801 includes terminal 816 indicating a voltage corresponding to the auxiliary loads 16. The bias power supply circuit includes input filtering, reverse voltage protection and supplies a predetermined regulated voltage(s) (e.g., 5V, 12V) from terminals 807 to the first and second switch device charge pump/driver circuits 802, 803, respectively. In the illustrated embodiment, the controller 804 is a processing device and corresponds to the controller 10 of FIGS. 4-1 and 7.

The first switch device charge pump/driver circuit 802 is configured to keep the first switch device 22 normally closed via an output voltage from terminal 809 of the charge pump/driver circuit 802. As aforementioned, the first switch device 22 can be opened using an active signal 850 output from the controller 804, subsequent to closing the second switch device 24, when the voltage of the primary ESD 14 becomes less than the voltage of the one or more auxiliary loads 16 by the predetermined magnitude and the Start_ON signal 41 is active. For instance, the controller 804 outputs the active signal 850 to restrict the output voltage from terminal 809 from closing the first switch device 22, thereby causing the first switch device 22 to open. In the illustrated embodiment, the Start_ON signal 41 can be provided to the controller 804. The second switch device charge pump/driver circuit 803 is configured to open and close the second switch device 24 via opening/closing gates of the second switch device 24 through a pass switch circuit 805 controlled by the switch control logic of the controller 804 via signal 860 output from the controller 804. In the illustrated embodiment, a pass switch 815 of the pass switch circuit 805 is kept open when signal 860 is inactive to restrict an output voltage from terminal 811 of the charge pump/driver circuit 803 from closing the gates of the second switch device 24. When signal 860 is active, the pass switch 815 is closed to allow the output voltage from terminal 811 to close the gates of the second switch device 24, causing the second switch device 24 to close.

The first switch device 22 includes a single or plurality of MOSFETs connected to in parallel, each having a respective gate resistor. A source of each MOSFET of the first switch device 22 is electrically coupled to the primary ESD 14 via terminal 814 and a drain of each MOSFET of the first switch device 22 is electrically coupled to the one or more auxiliary loads 16 via terminal 814. The first switch device 22 can be transitioned between open and closed states based on a voltage signal 812 received from the first switch device charge pump/driver circuit 802 to open the first switch device 22 when signal 850 is active. The second switch device 24 includes a single or plurality of MOSFETs connected to in parallel, each having a respective gate resistor. A source of each MOSFET of the second switch device 24 is electrically coupled to the one or more auxiliary loads 16 via terminal 816 and a drain of each MOSFET of the second switch device 24 is electrically coupled to the auxiliary ESD 20 via terminal 820. The second switch device 24 can be transitioned between open and closed states based on a voltage boost signal 813 received from the second switch device charge pump/driver circuit 803. For instance, the voltage boost signal 813 will close the second switch device 24 when the signal 860 output from the controller 804 is active and the voltage boost signal 813 will open the second switch device 24 when the signal 860 is inactive.

The controller 804, as described above with reference to the controller 10 of FIG. 3, receives the Ignition signal 13 from the ignition module 11, the Start_ON signal 41 from the starter solenoid module 40, and the Auto_Stop signal 43 from the pump module 42. The controller 804 is configured to command, via the active signal 850, the first switch device charge pump/driver circuit 802 to open the first switch device 22 within a short first predetermined period of time (e.g., 10 microseconds) when cranking voltage (e.g., ESD voltage 145) applied to the positive terminal of the primary ESD 14 drops by a first predetermined magnitude below that of the auxiliary load voltage 165. The first switch device 22 opens within a predetermined period of time after the second switch device 24 has been closed, wherein the controller 804 commands, via the active signal 860, the second switch device charge pump/driver circuit 803 to close the second switch device 24 within the predetermined delay (e.g., the maximum predetermined period of time of 2 milliseconds) upon the Start_ON signal 41 going active. Thereafter, the first switch device 22 remains open until the one or more predetermined conditions described above have been met. The controller 804 commands, via the inactive signal 860, the second switch device 24 to be opened through the voltage boost signal 813 of the driver circuit 803 using a combination of the Auto_Stop active, Starter_ON inactive or Ignition inactive signals 43, 41, 13, respectively, and other predetermined conditions previously described have been met.

Figure 11:
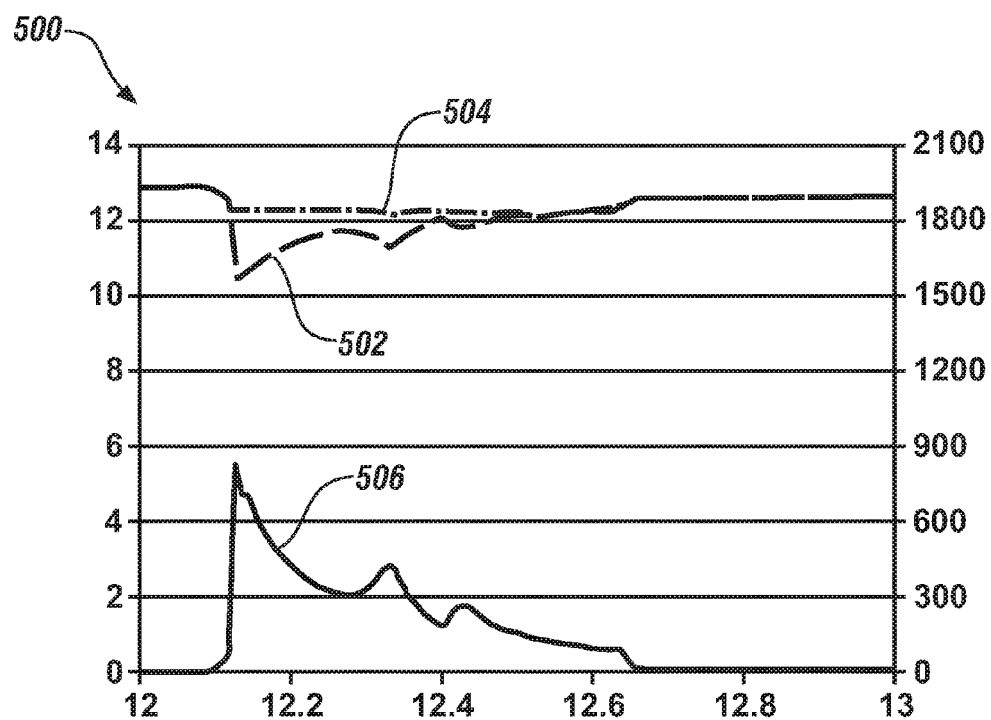
FIG. 11 illustrates an exemplary plot of cranking voltage, load voltage, and current during an engine cranking event utilizing the exemplary battery isolator circuit 200 of FIG. 5, in accordance with the present disclosure.

FIG. 11 illustrates an exemplary plot 500 of cranking voltage 502, load voltage 504, and current 506 during an engine cranking event utilizing the exemplary battery isolator circuit of FIG. 5, in accordance with the present disclosure. It will be understood that voltage is supplied from the primary ESD 14 during an autostart of the engine to supply energy required for cranking the engine. Accordingly, current is drawn from the primary ESD 14 during cranking of the engine.

The horizontal x-axis of plot 500 denotes time in seconds, the left-side vertical y-axis denotes voltage in Volts and the right-side vertical y-axis denotes current in Amps. In response to an engine cranking event at around 12.1 seconds, the cranking voltage 502 drops from about 13 Volts to less than 11 Volts and the current 506 drawn increases to about 890 Amps from zero Amps. As engine starting occurs, the current 506 begins to decrease back to zero Amps and the cranking voltage 502 begins to increase back to about 13 Volts. It will be appreciated that the load voltage 504 does not experience a significant voltage drop because the first switch device 22 is opened during the engine cranking event to disconnect the starter motor 12 and the primary ESD 14 from the one or more auxiliary loads 16 and the second switch device 24 is closed to electrically couple the auxiliary ESD 20 to the one or more auxiliary loads 16 prior to opening of the first switch device 22. Accordingly, the auxiliary ESD 20 is supplying energy to the one or more auxiliary loads 16 during the engine cranking event. Due to the disconnection between the starter motor 12 and the primary ESD 14 from the one or more auxiliary loads 16, the voltage load 504 does not experience a voltage drop during the engine cranking.

Figure 12:
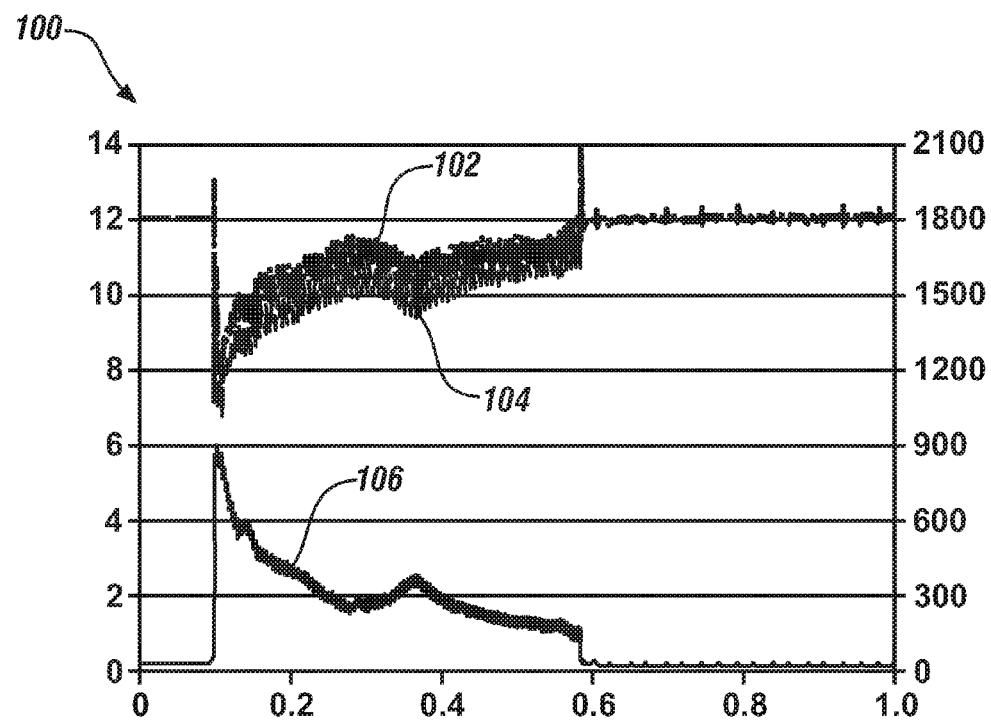
FIG. 12 illustrates an exemplary plot of cranking voltage, load voltage, and current during an engine cranking event without utilizing the known battery isolator circuit 300 of FIG. 2, in accordance with the present disclosure.

FIG. 12 illustrates an exemplary plot 100 of cranking voltage 102, load voltage 104, and current 106 during an engine cranking event without utilizing the exemplary battery isolator circuit of FIG. 2, in accordance with the present disclosure. It will be understood, that voltage is supplied from the primary ESD 14 during an autostart of the engine to supply energy required for cranking the engine. Accordingly, current is drawn from the primary ESD 14 during cranking of the engine.

The horizontal x-axis of plot denotes time in seconds, the left-side vertical y-axis denotes voltage in Volts and the right-side vertical y-axis denotes current in Amps. In response to an engine cranking event at around 0.1 seconds, the cranking voltage 102 drops from about 12 Volts to about 7 Volts and the current 106 drawn increases to about 900 Amps from zero Amps. As engine starting occurs, the cranking voltage 102 begins to increase back to about 12 Volts and the current 106 begins to decrease back to zero Amps. In contrast to plot 500 of FIG. 11, the load voltage 104 experiences a voltage drop from about 12 Volts to about 7 Volts similar to that of the cranking voltage 102. Because the starter motor 12 and the primary ESD 14 are not disconnected from the one or more auxiliary loads 16, the large voltage drop in the load voltage 104 results during the autostart event of the engine when the engine is cranked and large currents are drawn from the primary ESD 14. As aforementioned, large voltage drops in the load voltage 104 are referred to as voltage sag, and can result in diagnostic faults in the electrical system relayed to the driver, controller resets and other electrical failures such as vehicle interior lighting and accessories to being interrupted.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for assembling a battery distribution module for providing voltage stabilization during engine start events of a vehicle, comprising:
    electrically coupling a first electrical bus via a direct connection to each of:
        a first terminal of a first switch device to electrically couple one or more auxiliary loads to the first terminal of the first switch device; and
        a second terminal of a second switch device to electrically couple the one or more auxiliary loads to the second terminal of the second switch device;
    electrically coupling a second electrical bus via a direct connection to a second terminal of the first switch device to electrically couple a primary electrical energy storage device (ESD) to the second terminal of the first switch device, wherein the primary ESD is electrically coupled to the one or more auxiliary loads when the first switch device is closed;
    electrically coupling a third electrical bus via a direct connection to a first terminal of the second switch device to electrically couple an auxiliary ESD to the first terminal of the second switch device, herein the auxiliary ESD is electrically coupled to the one or more auxiliary loads when the second switch device is closed;
    attaching a printed circuit (PC) board to the first and second switch devices, the PC board including an integrated controller configured to control opening and closing of the first and second switch devices based on at least one of a plurality of signals received by the controller; and
    attaching a primary fuse terminal of the second electrical bus directly to a positive terminal of the primary ESD to electrically couple the positive terminal of the primary ESD to the second terminal of the first switch device and a starter motor.

2. The method of claim 1, further comprising:
    providing an auxiliary wire to electrically couple a positive terminal of the auxiliary ESD to an auxiliary fuse terminal of the third electrical bus;

providing an intelligent battery sensor (IBS) wire to electrically couple an IBS on the primary ESD to a first fuse of the primary fuse terminal; and providing a starter motor wire to electrically couple the starter motor to a second fuse of the primary fuse terminal.

3. The method of claim 2, further comprising:
providing a generator wire to electrically couple a generator to a third fuse of the primary fuse terminal.

4. The method of claim 3, further comprising:
providing a load module for managing electrical power from the primary and auxiliary ESDs to the one or more auxiliary loads each coupled to a corresponding fuse of the load module, the load module including a positive terminal electrically coupled to the first terminal of the first switch device and the second terminal of the second switch device.

5. The method of claim 4, further comprising:
providing a generator wire to electrically couple a generator to a corresponding fuse of the load module.

6. The method of claim 4, further comprising:
providing a bussed electrical center (BEC) wire to electrically couple a BEC module to a corresponding fuse of the load module, said BEC module managing power from the primary and auxiliary ESDs to loads requiring smaller currents than the one or more auxiliary loads.

7. The method of claim 1, wherein the plurality of signals received by the controller comprises:
an Ignition signal provided from an ignition module indicating a vehicle key-on condition when the Ignition signal is active and a vehicle key-off condition when the Ignition signal is inactive;
a Start_ON signal provided from a starter solenoid module indicating a starter solenoid is ON when the Start_ON signal is active and the starter solenoid is OFF when the Start_ON signal is inactive; and
an Auto_Stop signal provided from an electro-hydraulic transmission pump module indicating an electric motor driven pump is ON for supplying pressurized fluid to a transmission when the Auto_Stop signal is active and the electric motor driven pump is OFF when the Auto_Stop signal is inactive;
wherein the Ignition, Start_ON and Auto_Stop signals are generated by an engine control module.

8. The method of claim 7, wherein the integrated controller configured to control opening and closing of the first and second switch devices based on at least one of the plurality of signals received by the controller, comprises:
in response to the controller receiving the active Ignition signal and the active Start_ON signal, the controller configured to:
close the second switch device within a predetermined delay since the active Start_ON signal was received by the controller, and
open the first switch device only after the second switch device has been closed to electrically decouple the starter motor and the primary ESD from the load module.

9. The method of claim 1, wherein the integrated controller is configured to control opening of the first switch device only if the second switch device is closed.

10. The method of claim 1, wherein the primary fuse terminal is directly attached to the positive terminal of the primary ESD using clamp mounting features.

11. Apparatus for providing voltage stabilization during an engine starting event of a vehicle, comprising:
a battery distribution module, comprising:
a load module managing electrical power to one or more auxiliary loads of the vehicle, said load module comprising a positive terminal coupled to one or more fuses corresponding to said one or more auxiliary loads;
a first switch device electrically coupling a starter motor and a primary electrical energy storage device (ESD) to the load module only when closed;
a second switch device electrically coupling an auxiliary ESD to the load module only when closed, said second switch device located between said auxiliary ESD and said positive terminal of said load module; and
a controller integrated with a printed circuit (PC) board attached to the first and second switch devices, the controller configured to control opening and closing of the first and second switch devices based on at least one of a plurality of signals received by the controller;
the primary ESD electrically coupled via a direct connection to a primary fuse terminal of the battery distribution module, the primary fuse terminal electrically coupling the primary ESD to a second terminal of the first switch device and the starter motor; and
the auxiliary ESD electrically coupled via an auxiliary wire to an auxiliary fuse terminal of the battery distribution module, the auxiliary fuse terminal electrically coupling a first terminal of the second switch device to the auxiliary ESD.

12. The apparatus of claim 11, wherein the primary fuse terminal includes a first fuse electrically coupled to the starter motor and a second fuse electrically coupled to an intelligent battery sensor (IBS) on the primary ESD.

13. The apparatus of claim 12, wherein the primary fuse terminal further includes a third fuse electrically coupled to a generator.

14. The apparatus of claim 11, wherein the primary fuse terminal provides continuous uninterrupted electrical coupling between the primary ESD and the starter motor, the primary ESD supplying electrical power to the starter motor during the engine start event.

15. The apparatus of claim 11, wherein the one or more auxiliary loads are each coupled to a corresponding fuse of the load module, the load module including a positive terminal coupled to a first terminal of the first switch device and a second terminal of the second switch device.

16. The apparatus of claim 11, further comprising:
a bussed electrical center (BEC) module electrically coupled via a BEC wire to a corresponding fuse of the load module, the BEC module managing power from the primary and auxiliary ESDs to loads requiring smaller currents than the one or more auxiliary loads managed by the load module.

17. The apparatus of claim 11, further comprising:
a generator electrically coupled to a corresponding fuse of the load module.

18. The apparatus of claim 11, wherein the controller configured to control opening and closing of the first and second switch devices based on at least one of the plurality of signals received by the controller, comprises:
in response to the controller receiving an active Ignition signal from an ignition module indicating a vehicle key-ON condition and an active Start_ON signal from a starter solenoid module indicating initiation of the engine starting event, the controller configured to:
  close the second switch device within a predetermined delay since the active Start_ON signal was received by the controller, and
  open the first switch device only after the second switch device has been closed to electrically decouple the starter motor and the primary ESD from the load module;
in response to one or more predetermined conditions occurring while the first switch device is open, the controller configured to:
  close the first switch device to electrically couple the starter motor and the primary ESD to the load module; and
in response to the controller receiving, while the second switch device is closed, the earlier one of an inactive Ignition signal from the ignition module indicating a vehicle key-OFF condition and an active Auto_Stop signal from an electro-hydraulic transmission pump module indicating initiation of an engine autostop event, the controller configured to:
  open the second switch device to electrically decouple the auxiliary ESD from the load module.

19. The apparatus of claim 11, wherein the primary ESD electrically coupled via the direct connection to the primary fuse terminal comprises the primary fuse terminal directly connected to a positive terminal of the primary ESD using one of press-fit and clamp mounting features.

20. The apparatus of claim 11, wherein the battery distribution module further comprises:
  a first electrical bus directly connected to a first terminal of the first switch device and a second terminal of the second switch device;
  a second electrical bus directly connected to the second terminal of the first switch device and electrically coupled to the primary fuse terminal, wherein the primary fuse terminal and the electrical bus are electrically coupled to the first electrical bus to provide the electrical coupling of the primary ESD to the load module when the first switch device is closed; and
  a third electrical bus directly connected to the first terminal of the second switch device and electrically coupled to the auxiliary fuse terminal, wherein the auxiliary fuse terminal and the third electrical bus are electrically coupled to the first electrical bus to provide the electrical coupling of the auxiliary ESD to the load module when the second switch device is closed;
  wherein the first terminals each comprise a drain terminal of at least one metal-oxide-semiconductor field-effect transistor (MOSFET);
  wherein the second terminals each comprise a source of the at least one MOSFET.

* * * * *